United States Patent Office 3,719,473
Patented Mar. 6, 1973

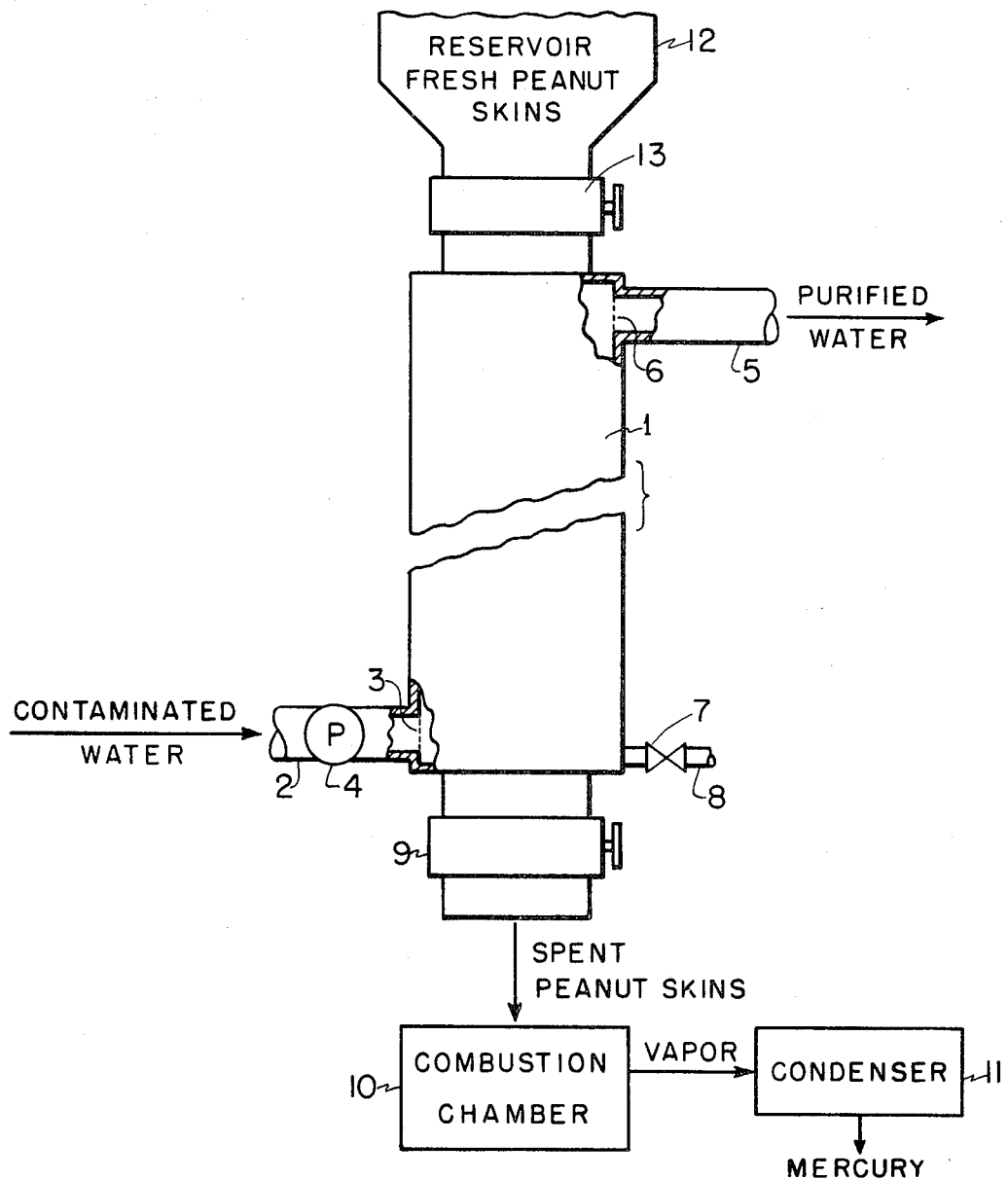

3,719,473
REMOVAL OF MERCURY FROM WATER
USING NUT WASTES
Anthony C. Waiss, Jr., Pinole, Judith A. Kuhnle, Alameda, and Mabry Eileen Wiley, El Cerrito, Calif., assignors to the United States of America as represented by the Secretary of Agriculture
Filed June 18, 1971, Ser. No. 154,369
Int. Cl. C22b 43/00
U.S. Cl. 75—121                                13 Claims

ABSTRACT OF THE DISCLOSURE

Mercury is effectively removed from water by contact with a nut waste such as peanut skins, walnut expeller meal, peanut hulls, and the like.

---

A non-exclusive, irrevocable, royalty-free license in the invention herein described, throughout the world for all purposes of the United States Government, with the power to grant sublicenses for such purposes, is hereby granted to the government of the United States of America.

DESCRIPTION OF THE INVENTION

The invention relates to and has among its objects the provision of a new method for removing mercury from water. Further objects of the invention will be evident from the following description wherein parts and percentages are by weight unless otherwise specified.

The annexed drawing is a diagrammatic view of apparatus for carrying out the process of the invention.

The law of conservation of matter states that matter cannot be created or destroyed. Thus, the total amount of mercury on and in the earth, whether in elemental, ionic, or organic form, is constant. Mercury is found naturally in oceans, seas, mines, rivers, lakes, mountains, etc. The mercury problem, therefore, is not one of existence but one of concentration and toxicity. It is the high toxicity of mercury compounds, especially methyl mercury, which makes the discharge of mercury into surface and ground waters so dangerous. The accumulation of mercury in particular areas results for the most part from man's use of this element in fungicides, insecticides, pharmaceuticals, etc. For instance, although the United States produces only 1/9 of the total world production of mercury, it uses 1/3 of the total world production. The discharge of industrial mercury wastes into rivers and lakes results in high concentrations of mercury in relatively small areas. Industry is faced with the task of disposing of mercuric wastes without expulsion into waterways.

Living organisms can tolerate mercury in minute concentrations without any toxic effects. However, there are certain bacteria in the mud and silt of our waters which readily convert both elemental and ionic mercury to methyl mercury. This form of mercury is water soluble and is readily ingested by plants, algae, lower forms of animal life, and, finally, by fish who feed on the aforementioned. In addition, methyl mercury is directly absorbed into the bodies of fish through the gils. The problem is this: Fish concentrate methyl mercury in their kidneys, liver, and their edible portions. Thus, a harmless situation becomes extremely hazardous. Fish can also directly transform elemental and ionic mercury to methyl mercury within their bodies. From these contaminated fish, mercury moves along to birds, chickens, etc., and, ultimately, to man. As the mercury moves along in the food chain, it becomes more and more concentrated.

In humans mercury accumulates in the brain, kidney, liver, hair, blood, and the fetus of pregnant women. In severe cases the damage caused is irreversible. Because mercury destroys the cells of the brain, permanent damage to the central nervous system can result. The proposed mercury standard for drinking water in the United States is 0.005 part per million. Brain damage can result from 20 parts per million, and this concentration may start a process leading to paralysis and death.

The invention described herein provides a means for obviating the problems outlined above. In accordance with the invention, water containing mercury is contacted with a nut waste, whereby the mercury is removed from the water. In a typical practice of the invention, the mercury-containing water is passed through a bed of the nut waste contained in any suitable vessel. The effluent, no longer contaminated with mercury, can then be re-used, for example, in industrial processes, or it can be deposited in a river, lake, or stream without contaminating such water course.

In the process of the invention, the nut waste acts as an absorbent in that mercury dissolved in the entering water as inorganic or organic compounds becomes bound to the waste. The action is thus not a mere matter of filtration, but one believed to involve chemical combination between the dissolved mercury and the waste. Of course, if the enering water should contain undissolved mercury—such as suspended particles of elemental mercury—these will be removed by physical entrapment.

In a practice of the invention, peanut skins are preferably employed as the absorbent, and the use of this material is emphasized in the present description by way of illustration and not limitation. In its broad ambit the invention encompasses the use of nut wastes of all kinds, for example, hulls, skins, woody shells, expeller meal, and pellicles of walnuts, peanuts, pecans, almonds, chestnuts, and the like. All of these substances have the ability to absorb a substantial quantity of mercury per unit weight of the material. Our investigations have shown, for example, that 100 parts of peanut skins will absorb 30 to 80 parts of mercury.

When the absorbent has taken up so much mercury that it loses its effectiveness, it is treated to recover its content of mercury. This is done by transferring the material to a combustion chamber provided with an arrangement for passing the evolved vapors through a condenser. In the combustion chamber the material is heated at a temperature which converts the organic matter to carbon. In the presence of this carbon, a known reducing agent, the absorbed mercury is converted to elemental mercury, which is collected in the condenser. In this way the mercury is recovered and can be recycled in industrial processes, e.g., electrolysis of brine, prepartion of fungicides, etc.

The primary advantage of the invention is that the discharge and accumulation of mercury in waterways is prevented. Thus, a source of mercury for conversion to its methylated derivative is reduced considerably. Natural forces can now act to redistribute the accumulated mercury so that its concentration in a particular area is reduced below the danger level.

Another advantage of the invention lies in the fact that it can easily be adapted to present water purification systems, whether industrial or municipal. Since most water purification systems involve a filtration procedure, the addition of an extra filter containing peanut skins or other nut waste would be routine.

Still another advantage of the invention is that metallic mercury can be recovered from the process. Thus, the cost of installation of the filtration system on an industrial level can be defrayed by the amount saved in reusing the recovered mercury. In addition, the nut wastes are very inexpensive and very effective in removing the mercuric ion.

The invention can be implemented on either an industrial or municipal level in various ways. An example of an industrial application is represented in the drawing annexed hereto. Chamber 1, lined with a non-amalgamatable material such as polyethylene, is filled with peanut skins ground to about 1 mm. in diameter. To prevent excessive packing of the peanut skins, they may be mixed with a dispersing agent such as charcoal, sand, gravel, and the like.

Water containing dissolved mercury is introduced into filter 1 by inlet conduit 2 fitted with screen 3. This water is impelled by pump 4 through filter 1. The purified water leaves the system via outlet 5, fitted with screen 6.

When the peanut skins have taken up so much mercury that they lose their effectiveness, the flow of water is cut off, and residual water drained out of the system via valve 7 and drain pipe 8. The peanut skins are removed through star valve 9 to combustion chamber 10 wherein they are heated to first evaporate water and eventually heated (in the absence of air) to a temperature on the order of 375° C. to carbonize the skins and expel mercury in vapor form. Finally, air is admitted so that the carbonized residue is burned to $CO_2$ and ash.

The vapors from combustion chamber 10 are conducted through condenser 11 maintained at a temperature below the boiling point of mercury (356.7° C.) but high enough to prevent condensation of water and empyreumatic substances. The liquid mercury which collects in condenser 11 is collected and may be reused for various industrial purposes.

To start up the water treatment cycle again, a fresh supply of peanut skins is introduced into chamber 1 from reservoir 12 via star valve 13.

The process of the invention may be applied on a continuous basis. In operating under such conditions, the water to be purified is continuously fed into column 1 through inlet 2 and purified water is discharged continuously through outlet 5. Concomitantly, fresh peanut skins are continuously fed at a predetermined rate into the system via star valve 13, and spent peanut skins are removed from the system at the same rate via star valve 9.

In an alternative embodiment of the invention, gravity flow is used. Water contaminated with dissolved mercury is passed downwardly through a column of peanut skins. The gravity flow-rate through peanut skins ground to 1 mm. in diameter is approximately 2 gallons per square foot per minute. This simplified filtration procedure constitutes but a minor alteration to either a municipal or an industrial water purification system.

The invention is further demonstrated by the following illustrative examples.

EXAMPLE 1

Nut waste absorption of mercuric ion from a concentrated solution

Peanut skins were ground and sieved to pass 1 mm. openings. Then, 5 g. of these skins were packed in a column 30 cm. in height and 12 mm. in inside diameter. The skins were washed with twenty times their volume of water.

The column was loaded with 5 ml. of an aqueous solution of mercuric acetate containing approximately 100 mg. of mercuric ion per ml. The column was then washed three times with 100 ml. of distilled water. These washings were analyzed for mercuric ion content by atomic absorption, which is sensitive to 1 p.p.m. of mercuric ion.

Walnut expeller meal was prepared in a similar manner to that of peanut skins, and applied in the same manner as described. The results are summarized in Table 1.

TABLE 1.—NUT WASTE ABSORPTION OF MERCURIC ION FROM A CONCENTRATED SOLUTION

| Absorbent | Mercuric ion applied, mg. | Mercuric ion concentration wash— | | | Total mercuric ion absorbed, mg. |
| --- | --- | --- | --- | --- | --- |
|  |  | 1 | 2 | 3 |  |
| Peanut skins | 495 | 0 | 0 | 0 | 495 |
| Walnut expeller meal | 495 | 0 | 0 | 0 | 495 |

EXAMPLE 2

Nut waste absorption of mercuric ion from a dilute solution

The procedure described in Example 1 was followed. However, in this case the columns were loaded with a mercuric acetate solution containing approximately 1 mg. of mercuric ion per ml. The results are summarized in Table 2.

TABLE 2.—NUT WASH ABSORPTION OF MERCURIC ION FROM A DILUTE SOLUTION

| Absorbent | Volume of solution applied, ml. | Mercuric ion applied, mg. | Mercuric ion concentration, wash— | | | Total mercuric ion absorbed, mg. |
| --- | --- | --- | --- | --- | --- | --- |
|  |  |  | 1 | 2 | 3 |  |
| Peanut skins | 575 | 575 | 0 | 0 | 0 | 575 |
| Walnut expeller meal | 495 | 495 | 0 | 0 | 0 | 495 |

Having thus described our invention, we claim:

1. A method for removing dissolved mercury from water containing the same, which comprises contacting said water with a nut waste, said nut waste being selected from the group consisting of nut hulls, skins, woody shells, expeller meals, and pellicles.

2. The methd of claim 1 wherein the mercury is in ionic form.

3. The method of claim 1 wherein the nut waste is peanut skins.

4. The method of claim 1 wherein the nut waste is walnut expeller meal.

5. A method for removing dissolved mercury from water containing the same, which comprises:
   (a) providing a column packed with a nut waste, said nut waste being selected from the group consisting of nut hulls, skins, woody shellls, expeller meals, and pellicles, and
   (b) allowing water contaminated with dissolved mercury to flow through said column by means of gravity.

6. The method of claim 5 wherein the nut waste is peanut skins.

7. The method of claim 5 wherein the nut waste is walnut expeller meal.

8. A method for removing dissolved mercury from water containing same, which comprises:
   (a) mixing a nut waste with a dispersing agent such as charcoal, sand, gravel, and the like, said nut waste being selected from the group consisting of nut hulls, skins, woody shells, expeller meals and pellicles,
   (b) prviding a column packed with the material from Step a, and
   (c) pumping water contaminated with dissolved mercury through said column.

9. The method of claim 8 wherein the nut waste is peanut skins.

10. The method of claim 8 wherein the nut waste is walnut expeller meal.

11. A method for recovering mercury from water containing mercuric ion, which involves:
   (a) filtering said water through a column packed with a nut waste to absorb the mercuric ion, said nut waste being selected from the group consisting of nut hulls, skins, woody shells, expeller meals, and pellicles, (b) heating the nut waste at such a temperature as to convert the waste to carbon and the mercuric ion to vapors of metallic mercury, and (c) collecting the vapors of metallic mercury by means of a condenser.

12. The method of claim 11 wherein the nut waste is peanut skins.

13. The method of claim 11 wherein the nut waste is walnut expeller meal.

References Cited

UNITED STATES PATENTS

| | | | |
|---|---|---|---|
| 3,476,552 | 11/1969 | Parks et al. | 75—121 X |
| 2,744,938 | 5/1956 | Urban | 210—39 X |
| 2,546,903 | 3/1951 | Morrell | 210—39 X |

FOREIGN PATENTS 654,695    6/1951    Great Britain.

HERBERT T. CARTER, Primary Examiner

U.S. Cl. X.R.

75—101 BE, 81; 210—24, 39, 502